United States Patent [19]

Karjala

[11] 4,322,972
[45] Apr. 6, 1982

[54] METHOD AND APPARATUS FOR FLOW-RATE VERIFICATION AND CALIBRATION

[76] Inventor: Arnold L. Karjala, Apartado 10159, Maracaibo, Venezuela

[21] Appl. No.: 182,602

[22] Filed: Aug. 29, 1980

[51] Int. Cl.³ ............................................. G01M 19/00
[52] U.S. Cl. ........................................ 73/168; 137/546
[58] Field of Search ...................... 73/3, 168; 137/546

[56] References Cited

U.S. PATENT DOCUMENTS 2,826,067  3/1958  Braunlich ............................. 73/168
3,179,291  4/1965  Umbach ................................ 73/168

Primary Examiner—S. Clement Swisher
Attorney, Agent, or Firm—Williamson, Bains, Moore & Hansen

[57] ABSTRACT

The instant invention provides a method and apparatus for the verification and calibration of pumping rates in systems having a volumetric pump drawing fluid from a tank. An effluent valve is connected to the base of the tank and in turn the valve is connected to the base of a calibrated column. The column is also connected at its top to the top of the tank thereby providing equalized pressure conditions within the column and the tank. A sight level gauge mounted on the calibrated column, or a transparent calibrated column alone, may be used to determine the liquid level. The liquid levels in both the calibrated column and tank are continually at equilibrium during normal pumping operations. In order to operate the invention, the effluent valve is closed and the decrease in the level of the fluid in the calibrated column is measured during a timed interval to determine the pumping rate. After completing the timed interval of calibration, the effluent valve is reopened immediately to continue, undisturbed, the normal pumping operation. The calibration apparatus is an integral and permanent part of the tank and pump suction system.

4 Claims, 2 Drawing Figures

METHOD AND APPARATUS FOR FLOW-RATE VERIFICATION AND CALIBRATION

BACKGROUND OF THE INVENTION

Typically in chemical storage and delivery systems, it may be required to be able to inject predictable and some times precise quantities of one fluid into another. Typically, such injection is done by means of a volumetric pump. While such pumps are capable of accurate metering, it is necessary to calibrate and measure the flow rate associated with such a pump in order to establish or verify its flow or pumping rate under existing circumstances since flow rate can vary with the viscosity of the fluid, the depth of the fluid in the tank, the existence of any applied pressure on the surface of the fluid and the different sizes, lengths, and configurations of the suction piping. Accordingly, in view of these changing conditions and the fact that each pump and storage system is somewhat unique, it is desirable to be able to check and calibrate the flow or pumping rate of any fluid storage system where accuracy is important. Also, it is desirable to be able to check the pumping rate at any given moment to be alerted to any pump malfunctioning and blockage in the pump suction or discharge lines.

The prior art has commonly utilized devices such as sight glasses mounted directly on the storage tank to determine changes in liquid level but such devices are difficult to use as the sole means of measuring a small change in level in a large storage tank since the level change may be almost imperceptible until some hours have passed, thus making it impossible to make immediate, meaningful projections of the flow rate. The use of the sight glass to make meaningful estimates of flow is even more complicated when the storage tank is irregular in configuration or shaped in a manner such that a change in level does not produce a proportionate change in volume over the entire depth range of the tank.

It is also known to measure flow rates by utilizing systems where fluid is released from the storage tank and filled into a small calibrated container isolated from the tank and which is branched off the suction line leading to the pump. The rate of removal from the container is carefully measured to obtain a flow rate. However, such systems do not measure the flow rate under the same conditions affecting the storage tank in that the pressure in the container due to depth of fluid is usually quite different from that of the storage tank and the air above the fluid in the container is seldom at the same pressure as that above the fluid in the storage tank; also the effective length and configuration of the suction line between the pump and the container is most often different from that between the pump and the storage tank. Therefore, the net positive suction head (NPSH) available at the pump suction valve is usually not the same during the pumping and calibration cycles which correspondingly affect the flow rates. Most often the pump is stopped before and after the calibration cycle, thus lending uncertainty to the actual pumping flow rates before and after the calibration cycle.

It is also known to measure flow rates from a small calibrated container, normally of a box configuration, which is isolated from the storage tank but which is an integral part of the pump suction system installed at approximately floor level. The fluid level in the container is controlled by float operated control valve installed on the incoming line from the storage tank. The fluid is drawn directly from the calibrated container during both the normal pumping operation and during the calibration cycle. This float box, calibrated container system is normally relatively expensive and requires additional installation area. It is generally limited to lower pumping rates and to unpressurized storage systems. Additional calibration time is usually required to obtain accuracy due to the relatively low height and large cross section of the container. Sedimentation within the calibrated container, and keeping the constantly fluctuating float and control valve operative, may require considerable maintenance effort. A defective float or control valve can readily cause overflow and spillage of expensive chemicals from the container. A separate liquid level indicator, at additional expense, is normally required for the storage tank.

It is, therefore, an object of this invention to provide a flow-rate verification and calibration device and method which is suitable for general use, which is available for immediate use at any moment during the pumping operations for rapid calibrations, which is capable of a high degree of accuracy, which is easy to maintain and which is inexpensive to manufacture. Economy is realized through the utilization of a single liquid level determining device for both the calibrated column and the storage tank. Dual calibration factors may be determined for the device, one factor applicable for the momentary flow-rate determinations utilizing the calibrated column and the other factor applied to determine overall consumption as observed from the liquid level changes in the storage tank.

SUMMARY OF THE INVENTION

A liquid storage tank connected to a volumetric pump is provided with an effluent outlet valve at the bottom of the tank. The valve is in turn connected to a column relatively small in cross sectional area compared to the tank and having a calibrated volume therein. The column is located exterior to the tank and visible to an operator and is connected at its top to the tank so that the pressures in the column and tank are equal. A sight gauge may be connected to the column to determine the fluid level in the column and in the tank. The column is an integral part of the storage tank and the suction line which leads to the pump. The fluid is drawn from the column during normal pumping operations as well as during the calibration cycle. When it is desired to measure the flow, the column is isolated from the storage tank by closing the tank effluent outlet valve. After a specific period of time, on the order of a minute or more, the decrease in fluid level within the column is measured for the flow rate calculation. The effluent outlet valve is then reopened without having disturbed the system or having turned off the pump, allowing the same pumping or flow rate to continue.

The invention thus makes it possible to measure the flow or pumping rate under conditions identical to those present in normal pumping operations from the storage tank, and to obtain an almost immediate determination of the flow rate, and to do so without upsetting or disturbing normal pumping operations before or after the calibration procedure, and wherein only a single valve need be activated at the beginning and end of the calibration process.

These and other objects of our invention will become readily apparent as the following description is read in conjunction with the accompanying drawings wherein like reference numerals are used to refer to the several views.

DESCRIPTION OF THE PREFERRED EMBODIMENT

Figure 1:
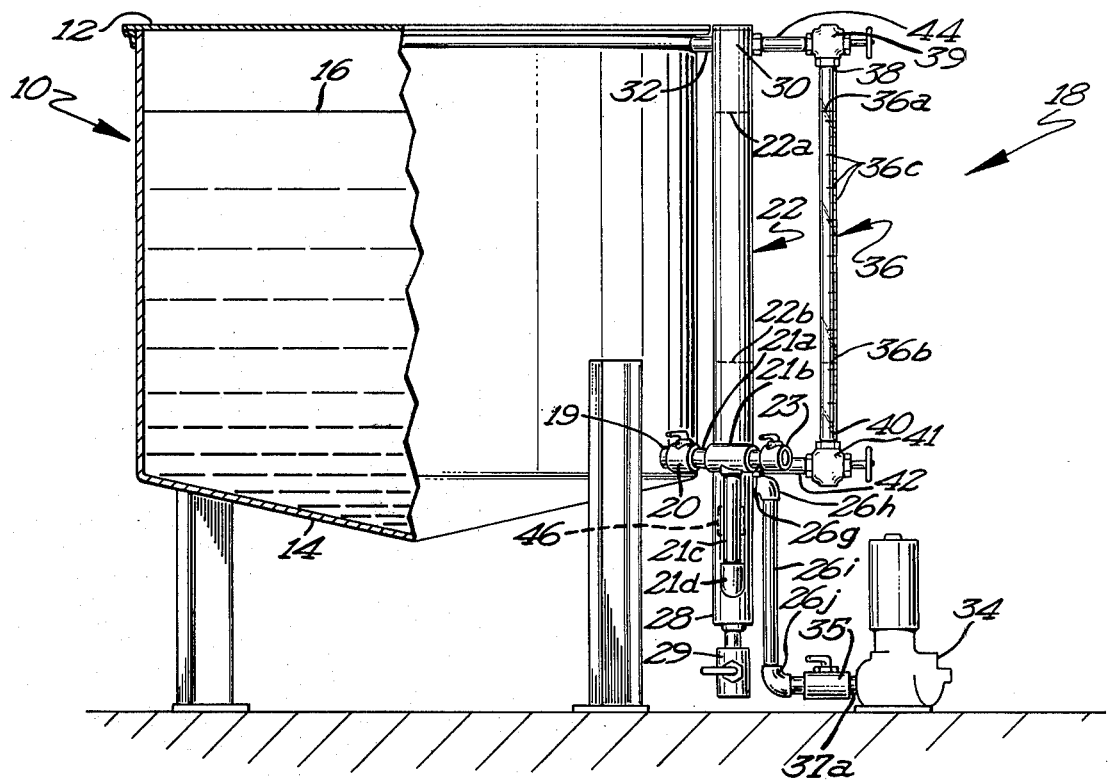
FIG. 1 is a front plan view of the instant invention partially cut away to show the liquid inside the tank.

The instant invention is designed for use with a storage tank 10 having a top 12 and bottom 14 and containing a fluid or liquid therein having a liquid level 16. While the tank shown is regular in shape, the instant invention is also suited to irregularly shaped tanks. The tank 10 is connected to a volumetric pump 34.

While the invention is particularly useful for measuring standard liquids such as industrial chemical and petroleum products, the term liquid or fluid, as used herein, should be understood to encompass slurries, polyelectrolytes, polymers, and the like.

Figure 2:
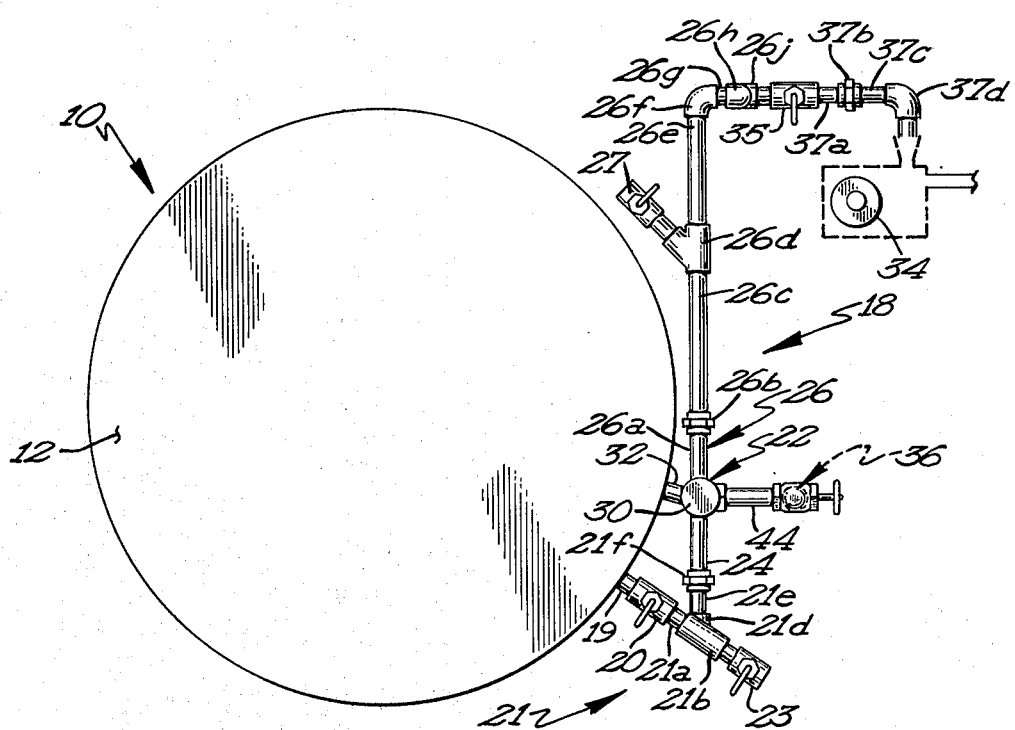
FIG. 2 is a top plan view of the system.

The instant metering system 18 is shown in both FIGS. 1 and 2. A connecting pipe 19 connects storage tank 10 to effluent outlet valve 20 and outlet valve 20 thence is connected to T-joint 21b by means of connecting pipe 21a. A sampling and cleaning valve 23 is attached to one side of T-joint 21b while connecting pipe 21c leads downwardly from T-joint 21b to elbow 21d. Elbow 21d is attached in turn to connecting pipe 21e which is joined to conduit 24 by means of union 21f. Conduit 24 then connects to the side of column 22. Column 22 extends substantially from the top 12 to the bottom 14 of tank 10 and is of a known cross-sectional area and volume. The cross-sectional area of column 22 is quite small as compared to the volume of tank 10 and, in the preferred embodiment, has a two-inch diameter (or other size as determined by the pumping capacities and design parameters).

Column 22 is connected to volumetric pump 34. Column exit conduit 26 is connected to column 22 above the column inlet 24 in order that sediment passing through the system will tend to settle in the bottom 28 of column 22, the pipe segment designated as 28 defining a sedimentation accumulation chamber. The top 30 of column 22 is connected to the top 12 of tank 10 by means of a connecting passage 32. Connecting passage 32 assures that the pressure in column 22 will be the same as that in tank 10.

A sight gauge 36 having a top 38 and a bottom 40 is connected to the top 30 and bottom 28 of column 22 by means of a top connector 44 and bottom connector 42, respectively. Top and bottom valves 39 and 41 respectively serve to enable isolation of sight gauge 36 from the system if it is desired to replace that gauge 36 or in the event that the gauge is broken. Sight gauge 36 is provided with calibration marks 36c thereon or on a separate rod or scale, which correspond to the level in volume in sight gauge 36 and column 22. In the preferred embodiment, sight gauge 36 is provided with a one-half inch diameter. Alternatively, column 22 may be totally transparent or alternatively provided with an automatic liquid level measuring device mounted thereon.

A float sensor 46 (or other single point liquid level sensor) may be provided in vertical column 22 to provide for alarm and/or for shut down of the system in the event that the tank runs dry or in case the effluent outlet valve is not reopened after calibration and the column runs dry. This sensor may be located at whatever minimum level is required so as to assure proper system operation.

Column exit conduit 26 is connected to pipe 26c by means of union 26b and pipe 26c is in turn connected to pipe 26e by means of Y-strainer 26d. Attached to one side of Y-strainer 26d is a valve 27 to permit blowdown of the strainer. Pipe 26e extends horizontally and is in turn connected to elbow 26f with a short horizontally extending piece 26g therebetween connected to elbow 26h. Connected to and extending downwardly from elbow 26h is vertical pipe 26i which is in turn connected to elbow 26j which is connected to valve 35. Connected on the downstream side of valve 35 is pipe 37a which is connected to pipe 37c by means of union 37b. Pipe 37c leads into elbow 37d which is in turn attached to volumetric pump 34.

OPERATION OF THE INVENTION

In the instant invention, operation is accomplished at any moment the pump is running. The effluent valve 20 is open thereby allowing fluid to move from tank 10 to column 22 from which the liquid is being drawn by pump 34. Normally, during the pumping and calibration cycles, valves 39 and 41 are open allowing the sight glass to be used continually as a level indicator. Also, during these cycles, valve 23, valve 27 and sedimentation drain valve 29 are closed as these vlaves are used normally for sampling or cleaning only. Valve 35 remains in an open position.

As is apparent from the design of this system, the initial liquid level 22a in column 22 will be the same as liquid level 16 in column 10. Also, the liquid level 36a in sight gauge 36 will also be at the same level as the tank level 16 and column level 22a. To initiate the calibration cycle, the liquid level 36a is duly noted, the effluent valve 20 is closed and the decrease in level in column 22 and sight gauge 36 is noted over a specified period of time (such as one minute or more). At the end of the specified period of time, the liquid level in column 22 and sight gauge 36 will have dropped to the level shown as 22b and 36b in FIG. 1 respectively which is duly noted and the effluent valve 20 immediately reopened. By utilizing the calibrations 36c on sight gauge 36, the volume pumped over the specified period of time is easily determined and the pumping rate revealed. Inversely, one can use a specific distance of liquid level drop from 36a to 36b and measure the exact time consumed to determine the respective pumping rate. At this point, if desired, the operator may adjust the pump 34 to provide a different rate and the calibration cycle can be again repeated.

Inasmuch as the pump is always drawing fluid from column 22 during the normal pumping and calibration cycles, the pumping rate before, during and after the calibration cycle remains the same due to constant suction line conditions.

To clarify the flow path involved, liquid flows outwardly from the bottom 14 of tank 10 through conduit 19 into effluent valve 20 and thence through pipe 21a, joint 21b, vertical pipe 21c, elbow 21d, pipe 21e, union 21f and thence through inlet conduit 24 into column 22. The liquid being pumped thence exits column 22 through exit conduit 26 and thence sequentially through union 26b, pipe 26c, Y-strainer 26d, pipe 26e, elbow 26f, horizontal pipe 26g, elbow 26h, vertical pipe 26i, elbow 26j, valve 35, pipe 37a, union 37b, pipe 37c, and elbow 37d and thence into volumetric pump 34.

It can be appreciated that the calibration apparatus and method presented herein can be readily automated. A solenoid valve may be installed in the tank effluent outlet and interfaced electronically with a timing device and an automatic liquid level measuring unit mounted on the calibrated column.

It can also be appreciated that the vertically calibrated column may be made accessible to the top thereof to permit an actual manual measurement of the levels therein. It can further be appreciated that the instant invention may be most valuable in instances where the liquid contained in the tank is at a non-atmospheric pressure. Also, it can be appreciated that the vertical column 22 need not be of a uniform diameter over the whole height thereof as shown but rather may have a relatively narrow breather segment at the top thereof and a calibrated segment comprising only a small portion of the total height.

It can be appreciated that though direct reference is made to volumetric metering pumps, herein, the invention is also applicable to other types of pumps where pumping rates are to be determined.

While the preferred embodiments of the present invention have been described, it should be understood that various changes, adaptations and modifications may be made therein without departing from the spirit of the invention and the scope of the appended claims.

What is claimed is:

1. A flow-rate calibration device for use with a volumetric pump drawing liquid from a tank, the tank having a top and a bottom, the device comprising:
    an effluent valve having an open position and a closed position, said valve being connected to the bottom of said tank;
    a vertical column comprising:
        a top;
        a bottom;
        an inlet, said inlet being connected to said effluent valve;
        an outlet, said outlet being connected to said pump;
    said column having a cross-section which is relatively small compared to said tank, said column extending from said tank top to said tank bottom, and said column top being connected to said tank top;
    means for determining the level in said column; and
    said inlet to said vertical column being positioned beneath said vertical column outlet and said column extending downwardly below said column inlet to define a sedimentation accumulation chamber in which sediment and other foreign matter may be received and retained before reaching said pump to thereby avoid interference with and unwanted variation of the flow rate of said pump and resultant error in the calibration of the pump.

2. The flow-rate calibration device of claim 1 wherein said sedimentation accumulation chamber comprises a pipe segment extending downwardly from said column inlet and said device further includes a sedimentation drain valve connected with said chamber to permit selective discharge of accumulated sediment from said chamber.

3. A method for measuring the instantaneous flow-rate through a pump drawing from a storage tank retaining liquid containing amounts of unwanted sediment and foreign matter, the tank having an outlet valve adjacent the tank bottom connected to an inlet on a volumetrically calibrated column having a top and bottom, said column having an outlet above said inlet and connected to said pump, the column top being connected to said tank top and the column bottom including a sedimentation accumulation chamber, the method comprising the steps of:
    pumping the fluid with said pump from the tank into the column and past the sedimentation accumulation chamber so as to allow capture of sediment and foreign matter in said chamber before interference by such sediment and foreign material in normal operation of the pump;
    closing said outlet valve thereby isolating said tank from said column;
    measuring the change in volume of liquid in said column during a time interval; and
    opening said outlet valve.

4. A flow-rate calibration device for use with a volumetric pump for drawing liqud from a liquid storage tank, the tank having a top and a bottom, the device comprising:
    an effluent valve having an open position and a closed position, said valve being connected to the bottom of said tank;
    a vertical column comprising:
        a top;
        a bottom;
        an inlet, said inlet being connected to said effluent valve;
        an outlet, said outlet being connected to said pump;
    said column having a cross-section which is relatively small compared to said tank, said column extending from said tank top to said tank bottom, and said column top being connected to said tank top;
    means for determining the level of liquid in said column; and
    said column inlet being located beneath said column outlet.

* * * * *